(12) United States Patent
Savatovich

(10) Patent No.: US 8,529,271 B2
(45) Date of Patent: Sep. 10, 2013

(54) MULTI-SENSORY EDUCATION DEVICE

(76) Inventor: Catherine Janelle Savatovich, Newmarket (CA)

(*) Notice: Subject to any disclaimer, the term of this patent is extended or adjusted under 35 U.S.C. 154(b) by 782 days.

(21) Appl. No.: 12/598,917

(22) PCT Filed: May 9, 2008

(86) PCT No.: PCT/IB2008/003421
§ 371 (c)(1),
(2), (4) Date: Nov. 4, 2009

(87) PCT Pub. No.: WO2009/037585
PCT Pub. Date: Mar. 26, 2009

(65) Prior Publication Data
US 2010/0143875 A1    Jun. 10, 2010

Related U.S. Application Data

(60) Provisional application No. 60/928,691, filed on May 11, 2007.

(51) Int. Cl.
*B43L 1/00* (2006.01)
(52) U.S. Cl.
USPC .......................................................... 434/416
(58) Field of Classification Search
USPC .............. 434/81, 85, 87, 88, 162, 163, 164, 434/165, 408, 416
See application file for complete search history.

(56) References Cited

U.S. PATENT DOCUMENTS

| | | | | |
|---|---|---|---|---|
| 3,512,273 | A * | 5/1970 | Baker, Jr. et al. | 434/163 |
| 4,878,844 | A * | 11/1989 | Gasper et al. | 434/159 |
| 6,030,225 | A * | 2/2000 | Chan | 434/159 |
| 6,050,824 | A * | 4/2000 | Stuart | 434/159 |
| 6,241,528 | B1 * | 6/2001 | Myers | 434/408 |
| 6,669,478 | B2 * | 12/2003 | Edwards et al. | 434/159 |
| 6,884,082 | B1 * | 4/2005 | James | 434/408 |
| 7,255,566 | B2 * | 8/2007 | Galbraith Coates | 434/408 |
| 7,354,273 | B2 * | 4/2008 | Donelan | 434/408 |
| 7,963,772 | B1 * | 6/2011 | Blazvick | 434/408 |
| 7,993,139 | B2 * | 8/2011 | Lehmann | 434/160 |

* cited by examiner

*Primary Examiner* — Kurt Fernstrom
(74) *Attorney, Agent, or Firm* — Rutan & Tucker LLP; Hani A. Sayed

(57) ABSTRACT

An educational tool is provided that allows for multi-sensory utilization to promote learning in a student. The educational tool consists of a learning board having a plurality of sides whereby at least one side comprising a textured characteristic thereon to allow for tactile and kinesthetic manipulation of the board. Additionally, the present invention also utilizes a learning board having at least a second side having a substantially smooth surface whereby the smooth surface would serve to visually stimulate and allow for promotion of responses to the textured side of the board by the student.

14 Claims, 4 Drawing Sheets

MULTI-SENSORY EDUCATION DEVICE

CROSS-REFERENCE TO RELATED APPLICATION

This application is related to and claims priority from the U.S. PCT Patent Application No. PCT/IB2008/003421 filed on May 9, 2008, which claims priority to U.S. Provisional Patent Application No. 60/928,691 filed on May 11, 2007.

FIELD OF THE INVENTION

The invention relates generally to the field of educational help devices, more specifically, the present invention relates to a multi-sensory educational device that may be utilized to increase educational development of an individual.

BACKGROUND OF THE INVENTION

There are many different educational tools that are utilized by teaching professionals to illustrate and allow for easier understanding and development of learning for a student. Chalkboards have been used for decades to illustrate visual characteristics to a student to help them visualize and understand information presented by an instructor. The chalkboard required a piece of chalk, typically of light color against a chalkboard of darker color to illustrate written information to the student. The problem with the chalkboard was that chalk was sometimes too light or did not properly illustrate information correctly to the student. Additionally, chalk tends to be dirty and causes secondary particulate when used. Additionally, chalkboards are typically very dark in color to contrast the chalk being used and therefore may be difficult to see at times.

A whiteboard or dry-erase board was subsequently developed and is one of the common writing devices used in educational environments to illustrate and help educate students using visual cues. Most of these dry-erase boards have a glossy surface and most commonly colored white where markings can be made. Whiteboards operate analogously to chalkboards in that they allow markings to temporarily adhere to the surface of the board. These markings are removed more easily than if one were to use a chalkboard. Dry-erase boards have become rather commonplace in most work environments, classrooms and the like.

However, unlike chalkboards, and the need for chalk to make markings on the board, the dry-erase board allows for the use of easy erasable marker to be utilized to make marks on the board. This use of an erasable, non-permanent marker allows the user to make frequent changes and alterations to the written form without the hassle of chalky residue normally accompanying chalkboards. Dry-erase boards may be constructed with a plurality of different materials, but are typically made of porcelain enameled steel which provides greater durability, but is typically heavy and difficult to move. However, one problem with this porcelain enameled steel is that over time, these whiteboards will typically begin to fade to a slightly gray color. The reason for the change in color is usually the marker leaving particulate behind which is absorbed by the board and eventually causes the board to change color. Additionally, another issue with this type of board is that it is not transparent. You cannot see any objects that may be placed behind the board. Moreover, another problem that presents itself with dry-erase boards is that they typically will exhibit some type of ghosting. Ghosting tends to occur as a result of the chemicals present in the marker wherein a small portion of the information is left behind and is still visible to an observer even after the information has been erased from the board.

However, a problem with many of these education tools is that they are singular in sensory perception by the student. The student uses only one, typically visual perception, in the learning process.

Additionally, another problem that exists is that many students need a plurality of different learning tools in order to properly advance in their studies. These prior art educational tools tend to be singular in their educational techniques in that they use visual characteristics and nothing else to teach the student.

Accordingly, a need therefore still exists for an improved educational tool that allows for a plurality of sensory techniques to be used to teach an individual.

Moreover, a need therefore exists for an improved educational tool having a plurality of sensory techniques and may allow for improved learning by the user by utilizing tactile characteristics to properly teach the individual.

Further, a need therefore still exists for an improved educational tool that is simple to use, allowing for increased learning capacity by the user and for ease of teaching by the professor and/or teacher.

SUMMARY OF THE INVENTION

The present invention relates to an educational tool that allows for multi-sensory utilization to promote learning in a student. The present invention utilizes a learning board having a plurality of sides whereby at least one side comprising a textured characteristic thereon to allow for tactile and kinesthetic manipulation of the board. Additionally, the present invention also utilizes a learning board having at least a second side having a substantially smooth surface whereby the smooth surface would serve to visually stimulate and allow for promotion of responses to the textured side of the board by the student.

To this end, in an exemplary embodiment the present invention, an apparatus for facilitating learning by an individual is provided. The apparatus having a first side and a second side wherein at least one of said first side having a smooth characteristic and the second side having a textured, contoured characteristic that may be utilized by the user to promote tactile learning. The apparatus having a second side wherein the second side may be smooth to allow the individual to utilize visual characteristics to view the board and/or to repeat information related to the individual on the first textured side of the board.

In an exemplary embodiment, the apparatus for use as an educational tool has a substantially flat surface on one side and a textured, contoured surface on the second side.

In an exemplary embodiment, the apparatus for use as an educational tool may be constructed of Lucite.

In an exemplary embodiment, the apparatus for use as an educational tool may be constructed of Plexiglas In an exemplary embodiment, the apparatus for use as an education tool may be constructed of acrylic.

In an exemplary embodiment, the apparatus has an interior portion which is a space between the first side and the second side whereby an article may be placed into the interior portion and wherein the article may contain indicia thereon whereby the indicia is viewable to the end user of the device.

In an exemplary embodiment, the apparatus has an attachment means to attach the first side of the device to the second side of the device.

In an exemplary embodiment, the apparatus has an attachment means whereby the attachment means allows for removal of the first side from substantial contact with the second side of the device and further wherein upon detachment of the attachment means, the interior portion of the device is accessible to the end user.

In an exemplary embodiment, the apparatus has a first side and the second side having an inside edge and an outside edge whereby the outside edge is utilized by a user and whereby the inside edge has a ridge and an indentation thereon for accommodate of an article having indicia thereon.

To this end, in an exemplary embodiment of the present invention, a method for instruction utilizing multi-sensory techniques in an educational environment is provided. The method comprising the steps of: providing an apparatus having a first portion and a second portion whereby the first portion and the second portion have at least one of said portions having a first side and a second side wherein at least one of said first side or second side having a textured, contoured surface thereon; at least one of said portions having a first side or second side having a smooth surface for utilization of a writing instrument thereon whereby the first portion and second portion are removably attached to each other; and an opening between said first portion and second portion adapted to allow for removable insertion of an article into the opening.

In an exemplary embodiment, the method further comprises the step of: inserting an article having an indicia thereon into the space whereby the indicia is visible through the first portion and the second portion of the apparatus.

In an exemplary embodiment, the method further comprises the step of: allowing a user to visually see the indicia through the first portion and the second portion whereby the user can physically touch the contoured surface to trace the indicia with their touch.

In an exemplary embodiment, the method further comprises the step of: allowing a user to visually see the indicia through the first portion and the second portion whereby the user is provided a writing instrument to trace the indicia with the writing instrument on smooth surface of the device.

In yet another exemplary embodiment of the present invention, the apparatus for use as an educational tool may be constructed of any suitable material that would allow for tactile, kinesthetic and/or visual representation to a student.

In an exemplary embodiment, the apparatus for use as an educational tool may be utilized by a plurality of individuals to provide hands on training and learning.

In an exemplary embodiment, the apparatus for use as an educational tool may have an interior portion whereby information to be displayed on the first side and/or the second side of the board may be inserted into the interior portion for visual inspection and utilization by a teacher or student.

In an exemplary embodiment, the apparatus for use as an educational tool may be utilized by a plurality of intellectual and learning levels.

In an exemplary embodiment, the apparatus for use as an educational tool may have a first translucent and/or transparent portion for visual representation to a viewer.

In an exemplary embodiment, the apparatus for use as an educational tool may have a plurality of boards that are translucent and/or transparent wherein the plurality of boards may be detachably affixed to one another for visual, tactile representation to a user.

In an exemplary embodiment, the apparatus for use as an educational tool may be provided wherein the tool may be used with guidance from an educator and/or teacher to promote visual, auditory, tactile, and kinesthetic stimulation of the end user.

In an exemplary embodiment, the apparatus for use as an education tool may be provided wherein the tool may be utilized by parents, friends, or other individuals to aid an individual to learn by utilizing the student's strengths in learning whether those strengths are audio, visual, and tactile or the like.

In an exemplary embodiment, the apparatus for use as an educational tool may be provided whereby a plurality of inserts may be utilized to promote learning by an individual whereby the inserts are inserted into an interior portion of the tool for representation on the first textured side and/or the second smooth surface.

In an exemplary embodiment, the apparatus for use as an educational tool may be provided wherein the tool may be constructed to fit any size environment from large charts to be utilized in classrooms, to individual use tools to be carried around in the binder of a student.

Various objects, features, aspects, and advantages of the present invention will become more apparent from the following detailed description of preferred embodiments of the invention, along with the accompanying drawings in which like numerals represent like components.

Additional features and advantages of the present invention are described herein, and will be apparent from the detailed description of the presently preferred embodiments and from the drawings.

Thus, specific embodiments and applications of a safety device system have been disclosed. It should be apparent, however, to those skilled in the art that many more modifications besides those already described are possible without departing from the inventive concepts herein. The inventive subject matter, therefore, is not to be restricted except in the spirit of the appended claims. The terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

DETAILED DESCRIPTION OF THE DRAWINGS

Figure 1:
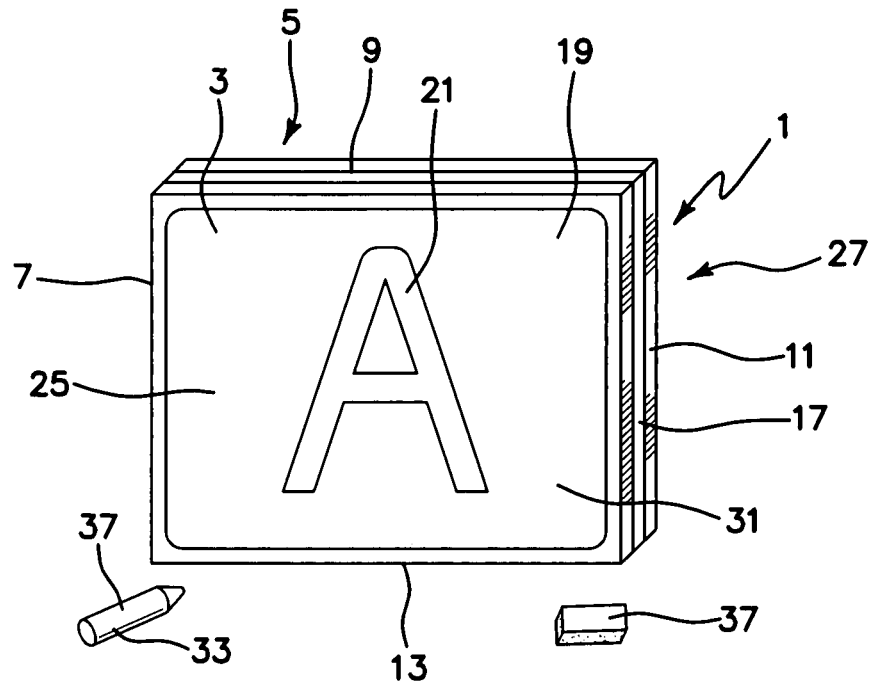
FIG. 1 is a front perspective view of the educational device in an exemplary embodiment of the present invention.

As illustrated in the figures, according to at least one aspect of the present invention, an educational device is provided. The educational device has at least a bottom portion 3 and a top portion 5. The bottom portion 3 and the top portion 5 may be made of a plurality of different materials. However, in an exemplary embodiment, the bottom portion 3 and the top portion 5 may be constructed of an appropriate polyester such as plastic. The educational device 1 may also have at least a first side 7, a second side 9, a third side 11 and a fourth side 13. In an exemplary embodiment, the educational device 1 may be configured to be in rectangular shape. However, it should be contemplated by those with ordinary skill in the art, that the educational device 1 may be configured in any appropriate shape for learning by an individual (not shown). It is contemplated that the educational device 1 may be in general circular form, thereby eliminating the first side 7, second side 9, third side 11 and fourth side 13. Additionally, it is contemplated that the educational device 1 may be configured to be trapezoidal, triangular, hexagonal, rectangular and/or any shape which would suit the purpose of use as a multi-sensory educational device 1.

As enumerated above, the multi-sensory educational device 1 may have a top portion 3 and a bottom portion 5. An opening and/or space 17 may be provided between the top portion 3 and the bottom portion 5 for placement of an article 19 there between. In an exemplary embodiment, an article may take the form of a paper having indicia 21 thereon, such as a number, a letter, a picture and the like. The article 19 may be placed in the opening 17 and slid into place between the top portion 3 and the bottom portion 5. It is contemplated that at least a portion of both the top portion 3 and the bottom portion 5 is translucent in nature thereby allowing for viewing of the article 19 from either the top portion 3 and/or the bottom portion 5. The article 19 may be a paper having a first side 25 and a second side 27 whereby the first side 25 may have one indicia 21 thereon and further wherein the second side 27 may have another indicia 21 thereon. However, it is contemplated that the indicia 21 presented on both the first side 25 and the second side 27 of the article 19 may be the same. The indicia 21 on the article 19 may be seen through the top portion 3 and/or the bottom portion 5 of the multi-sensory educational device 1. The top portion 3 of the multi-sensory educational device 1 may be constructed of a smooth polyester such that the top surface 31 of the top portion 3 may be smooth to the touch. Additionally, the top surface 31 may be of similar material as a typical whiteboard such that the top surface 31 may be utilized by an individual with a writing device 33. The writing device 33 may be able to mark the top surface 31 in any manner specified by the end user. However, it is contemplated that the writing device 33 may be an erasable marker 37. The erasable marker 37 may allow the top portion 3 of the educational device 1 to be utilized in a fashion similar to a whiteboard. However, as enumerated above, the top portion 3 has at least a portion that is translucent and/or see through. An eraser 39 may be provided to erase any markings on the top portion 3 of the multi-sensory educational device 1 when an instructor and/or end user wishes to erase any portion of the markings on the device 1.

Figure 2:
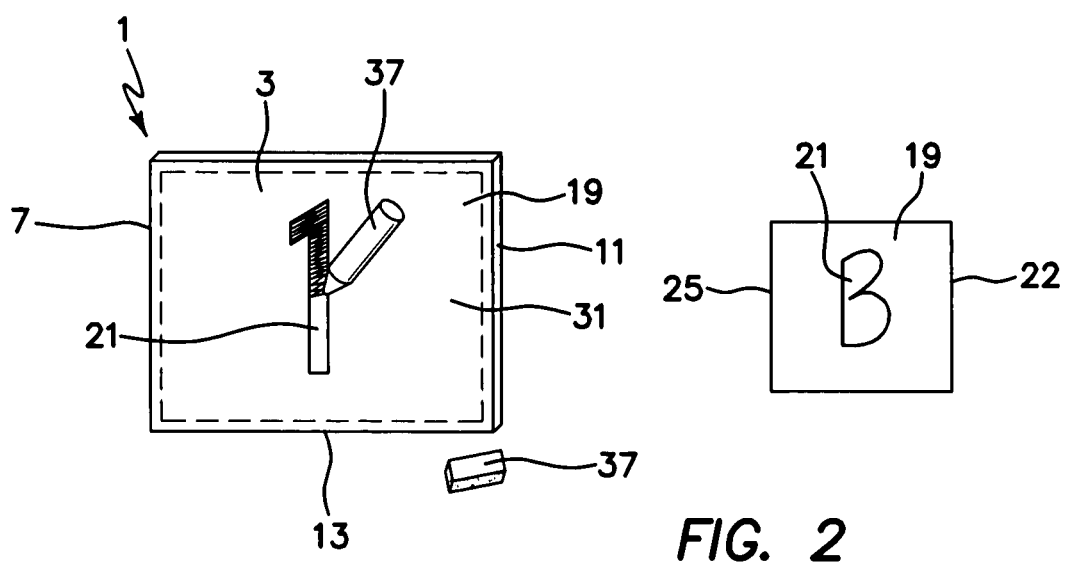
FIG. 2 is another front perspective view of the educational device and article in an exemplary embodiment of the present invention.

As further illustrated in FIG. 2, the top portion 3 of the multi-sensory educational device 1 may be at least semi-translucent whereby when the article 19 is placed in the space 17 between the top portion 3 and the bottom portion 5, the end user is able to see any indicia 21 on the article 19. In this way, the user may trace the indicia that is visually available to them on the top portion 3 of the device 1 and this tracing and manipulation of the device 1 may allow for enhanced learning capabilities, especially in individuals that learn in a visual way. After the individual has marked the top portion 3 of the device 1, the article 19 and its accompanying indicia 21 may be removed from the opening 17 to give the individual a better perspective of their work. Additionally, the article 19 may be removed from the opening 17 and may be replaced with another article 41 having another indicia 21 thereon. For example, if a student is learning the alphabet, it is contemplated that the first article 19 may have an indicia 21 thereon representing the letter "A", and after the student has made a marking on the top portion 3 of the educational device 1, the article 19 may be removed from the opening 17, and the marking made by the student may be erased utilizing the eraser 37. Thereafter, the second article 41 having an indicia 21 thereon representing the letter "B" may then be placed in the opening 17 and the student may then trace and practice learning in this manner.

Figure 3:
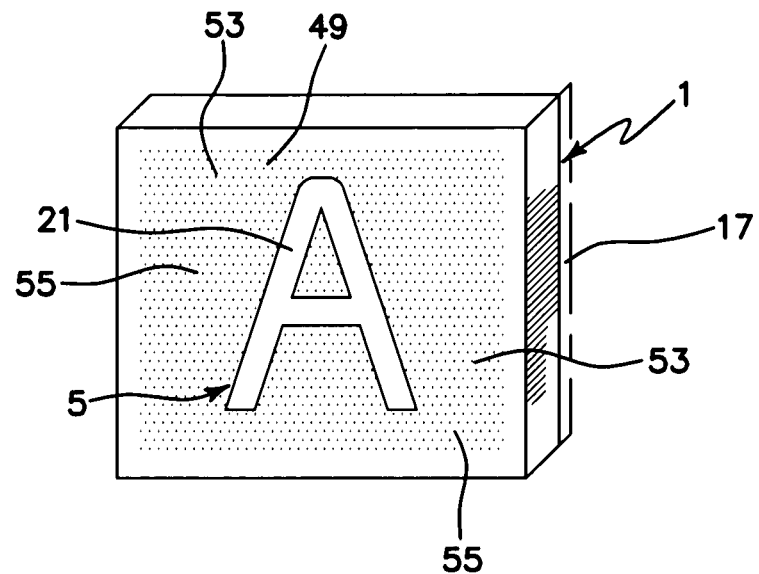
FIG. 3 is another front perspective view of the educational device in an exemplary embodiment of the present invention.
Figure 5:
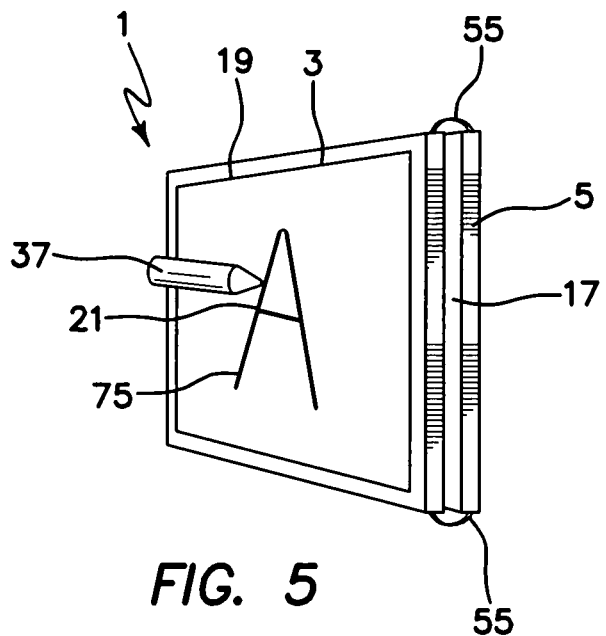
FIG. 5 is side perspective view of the educational device in an exemplary embodiment of the present invention.

FIG. 3 illustrates the bottom side 5 of the multi-sensory educational device 1. The bottom side 5 of the device 1 may also be substantially translucent in nature. However, the bottom side 5 of the device 1 is not made of a smooth material. On the contrary, the bottom side 5 may have a plurality of ridges 49 thereon and in an exemplary embodiment may have at least a concave portion 51 and a convex portion 53 as illustrated in FIG. 5. However, even the concave portion 51 and the convex portion 53 may be translucent in nature thereby allowing the user to be able to see any article 19 that may have been inserted into the opening 17 and additionally any indicia 21 that may be on the article 19. The concave portion 51 and the convex portion 53 may provide a tactile surface that may be physically touched by the individual user. In practice, when an article 19 is placed in the opening 17 and whereby the article 19 has at least an indicia 21 printed thereon, the student and/or end user may be able to use physical touch in order to trace and learn positions and other characteristics of the indicia 21 printed thereon without the need to write it. The tactile characteristics of the bottom portion 5 of the multi-sensory educational device 1 may provide a physical, hands on opportunity for learning, especially for those that learn best by using physical touch sensory mechanisms.

It is contemplated that an exemplary embodiment of the present invention has a bottom portion 5 which may have a concave portion 51 and a convex portion 53, however, it should be understood that any manifestation may be utilized as long as the bottom portion 5 provides a tactile use of the device 1, thereby allowing the student and/or user to utilize touch to advance learning capabilities.

Figure 4:
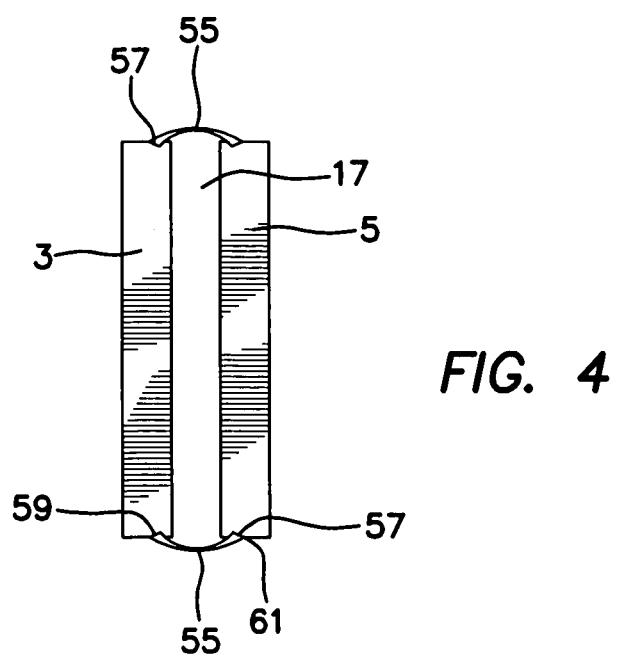
FIG. 4 is a side view of the educational device in an exemplary embodiment of the present invention.
Figure 4A:
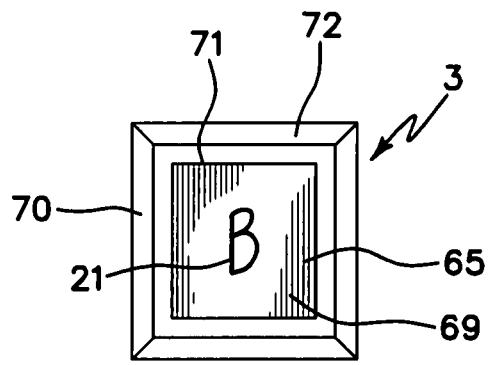
FIG. 4a is a rear view of the educational device in an exemplary embodiment of the present invention.
Figure 4B:
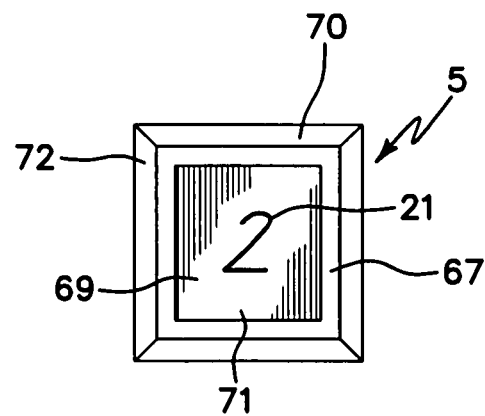
FIG. 4b is a front view of the educational device in an exemplary embodiment of the present invention.

As illustrated in FIG. 4, the top portion 3 and the bottom portion 5 may be attached to each other with an attachment means 55. It is contemplated that the attachment means 55 may be an adhesive in one exemplary embodiment whereby the opening 17 is static and unchanged. However, it is also contemplated that the attachment means 55 may have a fastening snap means 57 and whereby the snap means 57 may be located at a first side 59 and a second side 61 of the top portion 3 and the bottom portion 5. When the snap means 57 is engaged, only the opening 17 is visible from the outside of the device 1. However, if the user wishes to open the device 1, the snap means 57 may be disengaged and the top portion 3 may be separated from the bottom portion 5. FIG. 4a illustrates the inside edge 65 of the top portion 3 and FIG. 4b illustrates the inside edge 67 of the bottom portion 5. As illustrated in FIGS. 4a and 4b, the inside edge 65, 67 of the top and bottom portions 3, 5, may have indentation 69 thereon which is set in by a ridge 70 about the outside edges 72 of the bottom portion 5 and the top portion 3, whereby the indentation 69 is provided to accommodate an article 19. In an exemplary embodiment, the article 19 may be a standard sheet of paper 71 having indicia 21 thereon, whereby the paper 71 may be properly accommodated in the indentation 69 on both the inside edges 65, 67 of the top portion 3 and the bottom portion 5.

Figure 6:
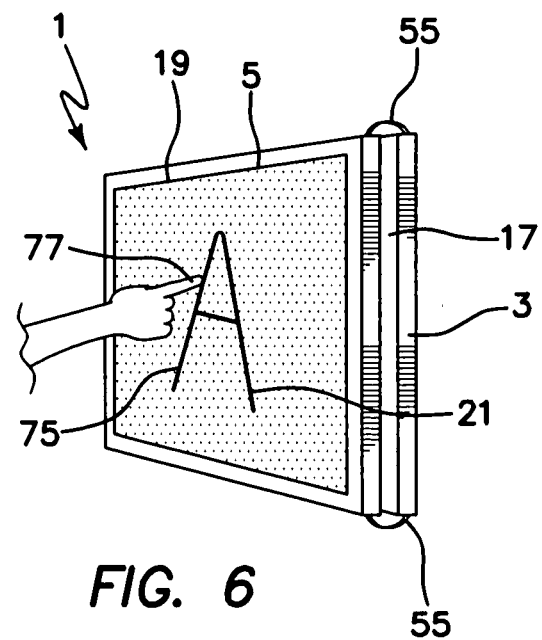
FIG. 6 is another side perspective view of the educational device in an exemplary embodiment of the present invention.

FIGS. 5 and 6 illustrate a perspective view of the multi-sensory educational device 1. FIG. 5 illustrates the top portion 3 of the device 1 whereby FIG. 6 illustrates the bottom portion 5 of the device 1. As can be seen in the two figures, the device 1 accommodates an article 19 whereby the article 19 has an indicia 21 printed thereon. In an exemplary embodiment, the indicia 21 is the letter "A" 75. In FIG. 5, the user is able to see the letter "A" 75 and may utilize a marker 37 to mark the top portion 3 of the device with their own letter "A" 75. FIG. 6 illustrates the same letter "A" 75 whereby the user may utilize their finger 77 to trace the characteristics of the letter "A" 75 instead of utilizing the marker 37. The individual user may start with the bottom portion 5 utilizing their finger 77 to trace the elements and characteristics of the indicia 21 and after sufficient practice, may turn over the device 1, to access the top portion 3 of the device 1 whereby the indicia 21 of the article 19 is still visible and may then utilize the marker 37 to mark the top portion 3 surface of the device 1. This multi-sensory access and contact with the device 1 may facilitate learning in those with learning disabilities, or individuals that find learning easier with tactile and a hands-on approach to learning.

Thus, specific embodiments and applications of the release agent of the present invention have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed is:

1. An apparatus for use in an educational environment, the apparatus comprising,
    a first side and a second side wherein at least one of said first side or second side having a concave portion and a convex portion that provide a textured, contoured surface thereon that is physically touched by a user;
    at least one of said first side or second side having a smooth surface for utilization of a writing instrument thereon; and
    an interior portion adapted to allow for removable insertion of an article into the interior portion.

2. The apparatus of claim 1 wherein the interior portion is located between the first side and the second side of the apparatus.

3. The apparatus of claim 1 wherein the first side has may have a plurality of textures thereon for tactile involvement by the user.

4. The apparatus of claim 1 wherein the first side and the second side are translucent.

5. The apparatus of claim 1 wherein the apparatus is constructed of Plexiglas.

6. The apparatus of claim 1 wherein the apparatus is constructed of acrylic.

7. The apparatus of claim 1 wherein the apparatus is constructed of a any suitable material to support educational use of the same.

8. The apparatus of claim 1 wherein the interior portion is a space between the first side and the second side whereby an article may be placed into the interior portion whereby the inserted article is viewable from both the for projection of the article to the first side and the second side of the apparatus.

9. The apparatus of claim 1 wherein the apparatus allows for tactile, kinesthetic, auditory, and visual representation of information to a user.

10. The apparatus of claim 1 wherein the apparatus has may be of a variety of shapes and sizes wherein in an exemplary embodiment, the apparatus is may be rectangular.

11. The apparatus of claim 1 wherein the interior portion is a space between the first side and the second side whereby an article is may be placed into the interior portion and wherein the article may contains indicia thereon whereby the indicia is viewable to the end user of the device.

12. The apparatus of claim 1 further comprising: an attachment means to attach the first side of the device to the second side of the device.

13. The apparatus of claim 1 further comprising: an attachment means whereby the attachment means allows for removal of the first side from substantial contact with the second side of the device and further wherein upon detachment of the attachment means, the interior portion of the device is accessible to the end user.

14. The apparatus of claim 1 wherein the first side and the second side have an inside edge and an outside edge whereby the outside edge is utilized by a user and whereby the inside edge has a ridge and an indentation thereon for accommodate of an article having indicia thereon.

* * * * *